M. S. HOPKINS & C. R. BARNETT.
APPARATUS FOR RECOVERY OF INGREDIENTS OF OILY INK.
APPLICATION FILED JULY 25, 1908.
932,550.
Patented Aug. 31, 1909.
2 SHEETS—SHEET 2.
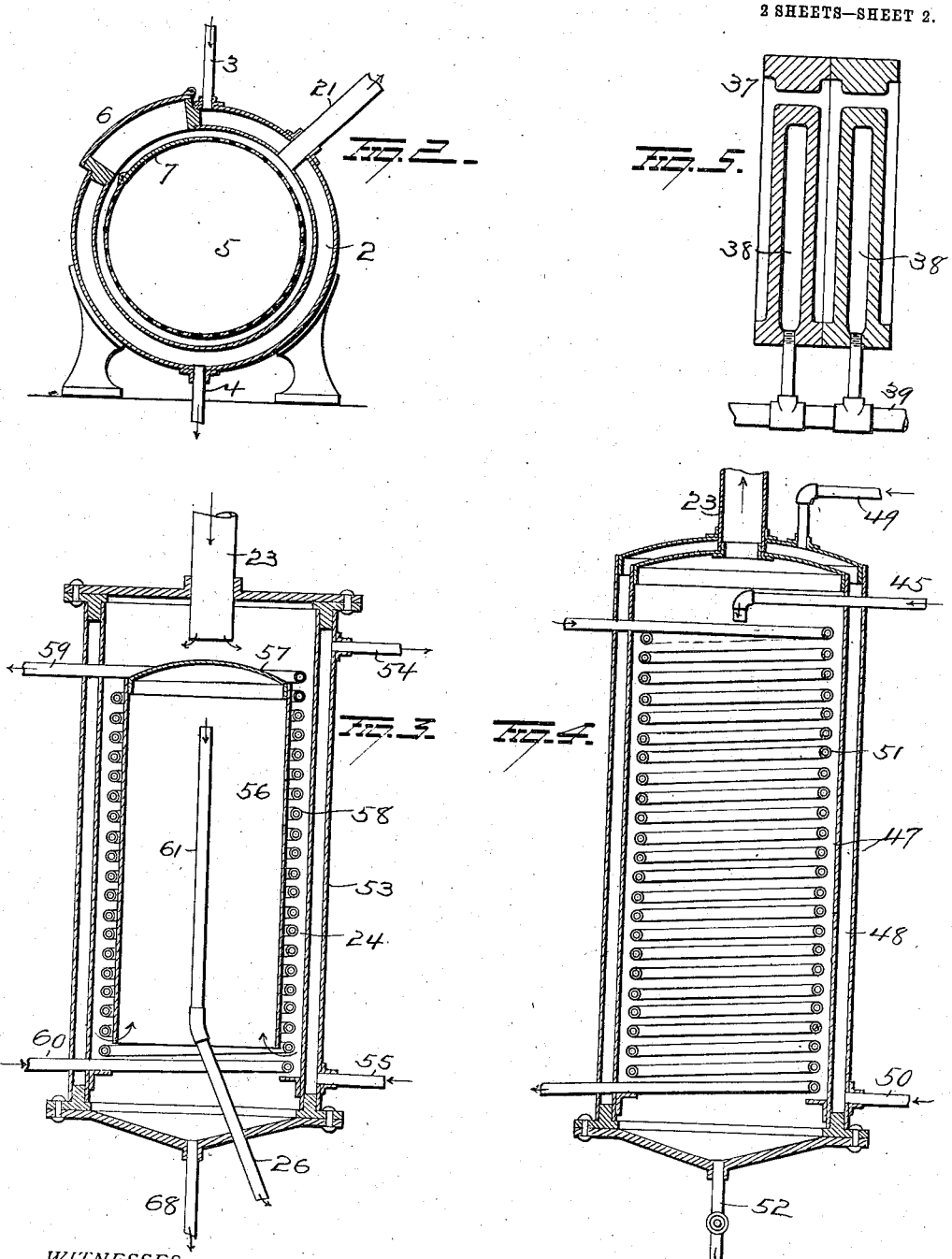

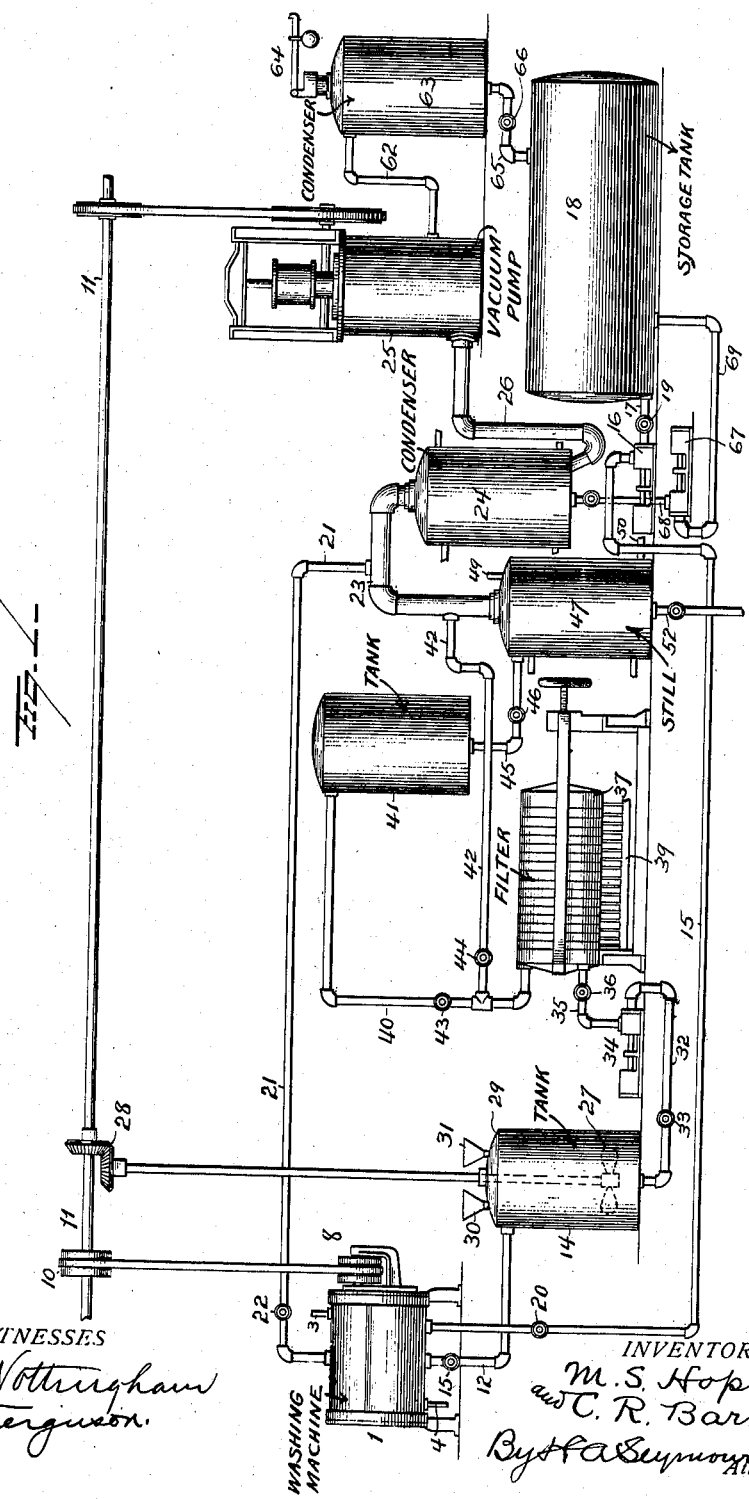

UNITED STATES PATENT OFFICE.

MATTHEW S. HOPKINS AND CHARLES RIDGELY BARNETT, OF ROLAND PARK, MARYLAND.

APPARATUS FOR RECOVERY OF INGREDIENTS OF OILY INK.

932,550.  Specification of Letters Patent.  Patented Aug. 31, 1909.

Application filed July 25, 1908. Serial No. 445,376.

*To all whom it may concern:*

Be it known that we, MATTHEW S. HOPKINS and CHARLES R. BARNETT, of Roland Park, in the State of Maryland, have invented certain new and useful Improvements in Apparatus for the Recovery of Ingredients of Oily Ink; and we do hereby declare the following to be a full, clear, and exact description of the invention, such as will enable others skilled in the art to which it appertains to make and use the same.

This invention relates to apparatus for recovering the component ingredients of oily pigment, such as the ink contained in cloths used for wiping engraving plates,—the object of the invention being to provide simple and efficient apparatus for use in removing oily pigment from cloths, with the use of a volatile solvent, for recovering the pigment from the liquor, and for recovering the oil and the solvent separately.

With this object in view, the invention consists in certain novel features of construction and combinations and arrangements of parts as hereinafter set forth and pointed out in the claims.

In the accompanying drawings; Figure 1 is a view of an apparatus embodying our improvements; Fig. 2 is a sectional view of the washing machine; Fig. 3 is a sectional view of the condenser; Fig. 4 is a sectional view of the still, and Fig. 5 is a fragmentary sectional view of the filter press.

For the purpose of removing ink from cloths used for wiping engraving plates, it has heretofore been proposed to wash the cloths in a solvent, such as naphtha, so that the resulting liquor will consist of naphtha carrying in solution or suspension, the pigment and oil of which the ink was composed. The constitutents of this liquor are valuable when properly separated and recovered, but heretofore, difficulty has been experienced in filtering the pigment from the oil, and as the latter is the most valuable ingredient of the liquor, it is highly desirable to effectually separate all of the pigment therefrom. Experience has demonstrated that if the liquor be passed (without previous chemical treatment) through a filter press, the latter will fail to effectually separate the pigment from the oil, and it is therefore important to so treat the liquor as to destroy the viscous quality of the oil and form a precipitate capable of carrying down the pigment, which can then be fully separated from the oil and solvent with the use of a filter press.

In carrying our invention into effect, we place the cloths or other material containing ink or other oily pigment, in a washing machine 1, and agitate them in the presence of a suitable solvent, such for example, as benzin, ethers, esters, carbon tetrachlorid, chloroform, carbon bi-sulfid, naphtha, turpentine or other oil solvent.

The washing machine may consist of a body portion having a steam jacket 2 with which steam inlet and exhaust pipes 3—4 communicate, and an open-work revoluble drum 5 to contain the cloths. The body portion of the machine is provided with a door 6 and the drum is similarly provided with a door 7. One journal of the drum 5 may be provided with a pulley 8 to which motion is transmitted by a belt 9 from a pulley 10 on a line shaft 11.

After the cloths have been treated for ten minutes (more or less) with benzin or other solvent in the washing machine, the resulting liquor will be discharged through a pipe 12 (having a controlling valve 13) to a tank or vat 14. A pipe 15 also communicates at one end with the washing machine and at the other end with a pump 16, the latter communicating by a pipe 17 with a solvent storage tank 18. A valve 19 is provided in the pipe 17 and a similar valve 20 is provided in the pipe 15 for controlling the passage of solvent to the washing machine.

After the cloths have been treated and the liquor (consisting of solvent, pigment and oil) has been run into the tank 14 as above described, the valve 13 will be closed and the valves 19—20 opened. The pump 16 will now be operated to force more solvent into the washing machine for the further treatment of the cloths; after which the liquor will be run into the tank 14 as before. This operation may be repeated several times if necessary.

The interior of the washing machine is connected, by a pipe 21, (having a valve 22) with a pipe 23 which communicates with a condenser 24, and the latter communicates through the medium of a pipe 26 with a vacuum pump 25 as hereinafter more fully explained. The vacuum pump may be driven by belt gearing from the line shaft 11.

When the cloths have been treated with volatile solvent in the washing machine as before explained, heat afforded by the steam jacket of the machine will serve to volatilize any solvent remaining in the cloths, and by opening the valve 22, these vapors will be drawn through the pipe 21 by the operation of the vacuum pump, and will be condensed in their passage through the condenser 24, the resulting condensed solvent finally reaching the storage tank 18, in a manner which will be explained further on. The cloths may now be removed from the washing machine, and subjected to a washing in water if desired.

An agitator 27 is located within the tank 14 and the shaft of this agitator may be driven from the line shaft 11, through the medium of suitable gearing 28. The cover 29 of the tank 14 may rest loosely thereon, and is provided with funnels 30—31 to permit the introduction of chemicals into said tank.

While the liquor in the tank is undergoing agitation, we treat the same with a substance or reagent, such as clay, infusorial earth, carbon, precipitated solids, or alcoholic or ethereal solutions of all reagents capable of entering into combination with a second substance which is introduced in such a way as to form a precipitate, the nature of which will render the insoluble matter capable of mechanical separation from the oil and solvent. We have found that an alcoholic solution of calcium chlorid, or lead acetate will serve efficiently for the reagent first introduced into the tank 14 with the liquor, and that the substance subsequently introduced during agitation of the material and which will cause a precipitate containing the pigment in the liquor that can be mechanically filtered or separated from the liquor and a solvent, may be a chemically equivalent amount of a solution of sulfuric acid and alcohol. The liquor contained in the tank 14 will be thoroughly agitated with the reagents above referred to until the precipitate is such as can be filtered through an ordinary filter press, or which can be separated from the fluid by any other mechanical means.

The failure of liquor to properly filter to remove the pigment, without being first treated as above described, is believed to be due, not so much to the nature of the pigment as it is to the viscous character of the carrier, and we have discovered that with the use of materials such as ethers, esters, solvent naphtha, alcoholic solutions of soap etc., such viscous property of the liquor is destroyed and thus mechanical separation of the carrier and pigment is rendered possible.

The tank 14 is connected by means of a pipe 32 having a valve 33, with a pump 34 and the latter is connected by a pipe 35 having a valve 36 with a filter press 37. The plates of this filter press are provided with chambers 38 through which steam (from a steam supply pipe 39) is circulated for heating the press. A pipe 40 connects the filter press with a tank 41, and with this pipe, one end of a pipe 42 communicates,—the other end of the pipe 42 being connected with the pipe 23, and, through the latter, with the condenser and vacuum pump. The pipe 40 is provided with a valve 43, and in the pipe 42, a valve 44 is located.

When the liquor in the tank 14 has been treated as before explained the valves 33 and 36 will be opened and the pump 34 operated to cause the liquor containing the precipitate to flow to and through the filter press. The now insoluble precipitate consisting very largely of pigment will be arrested by the filter press, while the fluid will leave the filter press by the pipe 40 (the valve 43 being open and the valve 44 closed) and enter the tank 41. The valves 36 and 43 will now be closed and valve 44 opened. Steam will be permitted to circulate through the filter plates and supply heat which will volatilize any solvent which may remain with the precipitate in the filter press. The vacuum pump 25 will be operated, and the volatilized solvent will be drawn from the filter, through the pipe 40 and, after being condensed by passage through the condenser, will find its way into the storage tank 18. Thus the precipitate will be dried in the filter press and any solvent which may have remained with it will be recovered. The solution containing the heavy oil now in the tank 41, will be discharged through a pipe 45 (having a valve 46) into a still 47. This still is made with a steam jacket 48 with which steam pipes 49—50 communicate, and said still may also be provided with a steam coil 51 for supplying heat to drive off the volatile solvent contained in the fluid, and leave the only remaining ingredient of the fluid,—heavy oil,—in the bottom of the still, from which it can be withdrawn through a valved discharge pipe 52.

The vaporized solvent will escape from the still through the pipe 23 to the condenser 24, and such passage of the vapor from the still will be augmented by the action of the vacuum pump 25. With the use of the vacuum pump to withdraw the vaporized solvent from the still, less heat will be required to vaporize the solvent and hence the oil which remains in the still will not be unduly darkened, as might be the case if more excessive heat were employed and the use of the vacuum pump omitted.

The condenser 24 comprises a shell having a water jacket 53 with which circulation pipes 54—55 communicate. The condenser also contains a drum 56 having its lower end open and its upper end 57 closed a short distance below the lower end of the inlet pipe 23. A water cooling coil 58 may be located in the condenser around the drum 56 and with the ends of this coil, pipes 59—60 communicate. The pipe 26 projects upwardly through the bottom of the shell of the condenser and communicates with a pipe section 61 projecting upwardly within the drum 56 and terminating near the upper closed end of the latter. Any uncondensed vapors in the condenser 24 (which has been found to be approximately one per cent.) will find exit through the pipes 61—26 to the vacuum pump, and will exhaust from the latter, through a pipe 62, to a second condenser 63. The construction of the condenser 63 may be the same as that of the condenser 24, and may, if desired, be provided with a safety valve 64. The lower end of the condenser 63 communicates with the storage tank 18, through the medium of a pipe 65 having a valve 66.

The major portion of the condensation of vaporized solvent will occur in the condenser 24, but as this condenser is in the circuit of the vacuum pump, the condensed solvent will not flow by gravity from the bottom of said condenser 24. In order, therefore, to remove the condensed solvent from the condenser 24 to the solvent storage tank 18, a pump 67 is employed. The bottom of the condenser 24 is connected, by a valved pipe 68 with the pump 67, and the latter is connected, by a pipe 69 with the solvent storage tank 18.

Having fully described our invention what we claim as new and desire to secure by Letters-Patent, is:—

1. In apparatus of the character described, the combination of means for treating material containing oily pigment with a solvent to remove said oily pigment, a container to receive the resultant liquor, means for agitating the liquor in said container, means for introducing chemicals into said container to form a precipitate containing pigment, means for mechanically separating the precipitate containing the pigment from the liquor, and means for separating the solvent from the remaining fluid to recover the oil.

2. In apparatus of the character described, the combination of means for treating material containing oily pigment with a solvent, means for treating the resultant liquor to form a precipitate therein containing the pigment, means for mechanically separating the precipitate from the liquor, means for treating the remaining fluid to vaporize the solvent and recover the oil, means for condensing the vapor, and means for recovering the condensed solvent.

3. In apparatus of the character described, the combination of means for treating material containing oily pigment with a volatile solvent, means for treating the resultant liquor chemically to form a precipitate containing pigment, means for mechanically separating the precipitate from the liquor, means for treating the remaining fluid to vaporize the solvent and recover the oil, means for condensing the vapor, means for recovering the condensed solvent and means for forcing the condensed solvent to the first-mentioned means.

4. In apparatus of the character described, the combination of a mechanical cloth-washing machine to contain a volatile solvent and material containing oily pigment, means for removing the liquor from the washing machine, a filter press, means for forcing the liquor through the filter press to remove precipitate containing the pigment, means for heating the filter press, a vacuum pump connected with the filter press to remove vaporized solvent from the latter, and means for condensing said vaporized solvent.

5. In apparatus of the character described, the combination of a washing machine to contain a volatile solvent and material containing oily pigment, means for withdrawing the liquor from the washing machine, means for treating said liquor to remove the pigment therefrom, a still to receive the remaining fluid, a condenser for condensing vaporized solvent driven off by the still, means for recovering the oil remaining in the still, and means for recovering the solvent from the condenser.

6. In apparatus of the character described, the combination of a washing machine to contain a volatile solvent and material containing oily pigment, means for withdrawing liquor from the washing machine, means for treating the liquor to remove the pigment, a still to receive the remaining fluid, a condenser communicating with the still to receive vaporized solvent from the latter, means for recovering oil from the still, and a vacuum pump for augmenting the passage of vaporized solvent from the still to the condenser.

7. In apparatus of the character described, the combination of a washing machine to contain a volatile solvent and material containing oily pigment, means for withdrawing the liquor from the washing machine, means for treating said liquor to recover the pigment therefrom, a still to receive the remaining fluid, a condenser communicating with the still to receive vaporized solvent from the latter, a vacuum pump connected with said condenser, means for recovering oil from the still and means for recovering condensed solvent from the condenser.

8. In apparatus of the character described, the combination of a washing machine to contain a volatile solvent and material containing an oily pigment, means for withdrawing the liquid from the washing machine, means for treating said liquor to recover the pigment therefrom, a still to receive the remaining fluid, a condenser communicating with said still to receive vaporized solvent from the latter, a vacuum pump communicating with said condenser, a second condenser communicating with the vacuum pump, a solvent storage tank, a valved pipe connecting said second condenser with the storage tank, and a pump connected with the first mentioned condenser and with the storage tank.

9. In apparatus of the character described, the combination with a washing machine, of a tank communicating therewith, means for agitating liquor in said tank, a mechanical filter, a pump for forcing liquor from said tank through the mechanical filter, a still communicating with said filter, a condenser communicating with said still, a storage tank communicating with the condenser, and means for forcing fluid from said storage tank to the washing machine.

In testimony whereof, we have signed this specification in the presence of two subscribing witnesses.

MATTHEW S. HOPKINS.
CHARLES RIDGELY BARNETT.

Witnesses:
LEWIS N. HOPKINS, Jr.,
JOSEPH T. BYRNE.